UNITED STATES PATENT OFFICE.

FRANK M. BOYLES, OF BALTIMORE, MARYLAND, ASSIGNOR TO McCORMICK & CO., OF BALTIMORE, MARYLAND, A CORPORATION OF MARYLAND.

OLEORESIN PASTE AND PROCESS OF MAKING SAME.

1,324,538. Specification of Letters Patent. Patented Dec. 9, 1919.

No Drawing. Application filed April 4, 1918. Serial No. 226,724.

*To all whom it may concern:*

Be it known that I, FRANK M. BOYLES, a citizen of the United States, residing at Baltimore city, State of Maryland, have invented certain new and useful Improvements in Oleoresin Pastes and Processes of Making Same; and I hereby declare that the following is a full, clear, and exact description thereof.

This invention relates to food flavors and condiments, and its object is to enable the oleo-resins of spices and highly aromatic vegetable substances to be rendered immediately available for use in flavoring by making a pasty preparation of such oleoresin; such preparation containing the full flavor of the oleo-resin and can be added, if desired, to the food after the same is cooked or prepared; thus avoiding the waste caused by evaporation of the volatile portion of the oleo-resin, as heretofore prepared, which commonly have to be added to foods and cooked therewith to obtain the desired flavor.

The oleo-resin of the spices and other aromatic vegetable substances consist of a mixture of the volatile (or essential) oil; the fixed (or non-volatile) oil, if any is present; (as in paprika and Cayenne pepper); the resins; and the crystalline principle (as in the case of vanilla and red pepper and white pepper). The oleo-resins contain all the flavor of the spices but differ in flavor from the volatile oils. Such oleo-resins have been and are obtainable in various well known ways.

The volatile oils, the fixed oils, the resins and the crystalline principle of practically all spices and other aromatic vegetable substances are soluble in ether, acetone, carbon tetrachlorid, and other similar liquids and to a limited extent in acetic acid; and when the spices are percolated with these liquids the oleo-resins are extracted therefrom, and as the boiling temperatures of such liquids are lower than that of the constituents of the oleo-resins the liquids can be separated from the oleo-resins at a low heat, with practically no loss of oleo-resin.

Some of the spices, notably ginger, contain a class of resins that are not completely soluble in ether, carbon tetrachlorid, etc., but are soluble in alcohol; and such alcohol soluble resin portions will not dissolve in the ether soluble resin portions if the two are brought together; such alcohol soluble resin portion possesses a large amount of flavor.

In some of these oleo-resins part of the resin is not soluble in the oil portion and therefore will separate therefrom, to a greater or less degree, and settle on the bottom of the container; so that it may be said that the oleo-resins of spices and of other aromatic vegetable substances are not homogeneous mixtures, but after standing usually consist of two or more layers, and it is practically impossible by simply mixing or stirring to form a homogeneous mixture thereof. Such oleo-resins are insoluble in water, and do not readily mix therewith, and when added to water a large part will rise and float on the top thereof.

By my invention the aforesaid oleo-resins can be readily dissolved in or mixed with water or aqueous substances, such as foods and food preparations; the entire flavoring properties of such oleo-resins is utilized; and the waste of flavoring properties which has heretofore resulted and been attendant upon the use of such oleo-resins as heretofore prepared is avoided.

In pastifying oleo-resins; I take the desired oleo-resin (usually obtained by extracting the spices with ether, acetone, carbon tetrachlorid, alcohol, acetic acid or other volatile solvent, either separately, combined or in succession in any suitable manner) and form it into a homogeneous oleo-resin paste by adding to the oleo-resin water and gelatin, or flour, or starch, or other gelatinous or starchy substances. Hereinafter in the description and in the claims I will refer to these starchy or gelatinous substances by the word or term starchy "paste," intending thereby to include any of the aforesaid starchy or gelatinous substances and their equivalents practically usable for the purpose specified.

The proportions of the oleo-resin and starchy paste may be varied to suit the maker. The following proportions however produce good results: 10 parts of starchy paste, 60 parts of water and 100 parts of oleo-resin.

I propose to pastify the oleo-resins of allspice (or pimento) cassia, cinnamon, cloves, ginger, mace, nutmeg, paprika, (or pimiento) red pepper, sage, thyme, marjoram, anise, caraway, cardamom, celery, coriander, cumin, fennel, black pepper, white pepper, tarragon, mustard, walnut, onion, garlic, vanilla and tonka.

The oleo-resin of vanilla contains the crystalline principle vanillin; red pepper the crystalline principle capsicin; and black and white pepper the crystalline principle piperin. In the oleo-resins of black and white pepper, and sometimes of red pepper, the crystalline principles often separate and settle to the bottom with the resins. By slightly warming such oleo-resins the crystalline principles will dissolve in the oleo-resins; and if the pastifying is then carried out these crystalline principles will be included in and evenly distributed in minutely divided form throughout the whole of the oleo-resin paste.

Such oleo-resin paste is then mixed with a syrup such as sucrose, invert sugar, glucose or glycerin. Hereinafter in the description and in the claims I will refer to these syrups by the word or term "syrup" intending thereby to include any of the aforesaid syrups or their equivalents practically usable for the purpose specified. The proportions of the syrup and oleo-resin pastes can be varied from 20 to 50 per cent. by weight of the syrup to 80 to 50 per cent. of the oleo-resin paste, the invention not being restricted to any particular range of proportions. The addition of the syrup renders the oleo-resin-paste more easily miscible with water and watery bodies and makes it easier to incorporate it thoroughly into the product being flavored.

Such pasty oleo-resin compounds are especially useful for food flavors or condiments, and comprises a vegetable oleo-resin substance non-miscible with water, a starchy paste, and a syrup, preferably invert sugar, together forming a pasty mass wherein the oleo-resin is thoroughly and minutely disseminated and suspended; such oleo-resin paste compound being capable when mixed with water or watery compounds of readily disintegrating therein and leaving the non-miscible substance suspended in the mixture.

Such oleo-resin paste compound is homogeneous throughout and any portion of such paste compound will contain the full flavor of the spice or aromatic vegetable substance.

The resultant oleo-resin paste compound is miscible in water and watery food preparations, and renders available at once, without waste, all of the flavor of the spices and other aromatic vegetable substances; and it is not necessary to add such oleo-resin paste compound to food while hot; and it can be added to the food after the cooking operation, so that none of the volatile portions of the oleo-resins or their flavor will be lost by evaporation during the cooking.

The oleo-resins of the species are very strong and very hot, producing severe burns if they come in contact with the skin; but this disadvantage is practically overcome by my oleo-resin paste compound which can be handled with safety.

What I claim is:

1. A pasty oleo-resin composition for use as food flavors or condiments, comprising a vegetable oleo-resin substance non-miscible with water, a starchy paste, and a syrup together forming a pasty mass wherein the oleo-resin is thoroughly and minutely disseminated and suspended; such oleo-resin paste being capable when mixed with water or watery compounds of readily disintegrating therein and leaving the non-miscible substance suspended in the mixture.

2. An oleo-resin pasty composition for food flavors or condiments, comprising an oleo-resin substance non-miscible with water; a starchy paste; an invert sugar, forming a pasty mass wherein the oleo-resin is thoroughly and minutely disseminated and suspended; such oleo-resin paste being capable when admixed with water or watery compounds of readily disintegrating therein and leaving the non-miscible substance suspended in the mixture.

In testimony that I claim the foregoing as my own, I affix my signature.

FRANK M. BOYLES.